United States Patent [19]
DeVries

[11] Patent Number: 5,575,494
[45] Date of Patent: Nov. 19, 1996

[54] TRAILER COUPLER GUARD

[76] Inventor: Dale D. DeVries, 215 E. 7th, Red Wing, Minn. 55066

[21] Appl. No.: 374,326

[22] Filed: Jan. 18, 1995

[51] Int. Cl.$^6$ ..................................................... B60D 1/60
[52] U.S. Cl. .......................................................... 280/507
[58] Field of Search ................................... 280/507, 506, 280/511, 477; D12/162

[56] References Cited

U.S. PATENT DOCUMENTS

| | | | |
|---|---|---|---|
| D. 355,630 | 2/1995 | Liland et al. | D12/162 |
| 2,968,300 | 1/1961 | Allen | 124/23 |
| 3,237,969 | 3/1966 | Geresy | 280/507 |
| 3,526,110 | 9/1970 | Foote | 280/507 X |
| 4,291,557 | 9/1981 | Bulle et al. | 280/507 X |
| 4,509,770 | 4/1985 | Young et al. | 280/507 |
| 4,582,902 | 4/1986 | Young et al. | 280/507 |
| 4,738,293 | 4/1988 | Ostrom et al. | 280/507 X |
| 4,955,968 | 9/1990 | Beckerer, Jr. | 280/507 |

FOREIGN PATENT DOCUMENTS

| | | | |
|---|---|---|---|
| 2432947 | 4/1980 | France | 280/507 |
| 4029131 | 12/1994 | WIPO | 280/507 |

OTHER PUBLICATIONS

"Bumber Bob™ Coupler Cover", Overton's Advertising Brochure, dated prior to Jan. 18, 1995.

*Primary Examiner*—Eric D. Culbreth
*Assistant Examiner*—F. Zeender
*Attorney, Agent, or Firm*—Nawrocki, Rooney & Sivertson, P.A.

[57] ABSTRACT

A guard for a trailer coupler having a lateral marginal flange defining a portion of the perimeter thereof. The guard includes a generally U-shaped member having a first longitudinal surface defining a contiguous inside perimeter of the U-shaped member. The first longitudinal surface has a channel formed therein extending the length of the inside perimeter of the U-shaped member. In use, the guard is placed in contact with the coupler with at least a portion of the lateral marginal flange received within the channel. The U-shaped member includes a first and a second leg extending laterally from a closed end of the U-shaped member. The first and second legs angle toward each other as they extend away from the closed end of the member so that the legs flex and releasably secure the U-shaped member when placed over the lateral marginal flange. The guard is preferably injection molded so that the preferred U-shape is preformed. Polymeric materials are preferred with polyurethane selected in a preferred embodiment.

16 Claims, 1 Drawing Sheet

TRAILER COUPLER GUARD

TECHNICAL FIELD

The present invention relates generally to guards for a trailer hitch, tongue and coupler assembly. More particularly, the guard of the present invention is a U-shaped polymeric member which is designed to fit on the coupler flange of a trailer tongue coupler to protect the vehicle from damage.

BACKGROUND OF THE INVENTION

Trailer hitch assemblies incorporating a ball on a vehicle and a trailer having a tongue with a bulbous hollow receptacle for receiving such ball on the vehicle are well known. The bulbous receptacle on the tongue of the trailer and associated locking mechanism are generally referred to as the trailer coupler. The structural design of a trailer coupler has become standardized. Geresy (U.S. Pat. No. 3,237,969) discloses the standard trailer coupler design which is fabricated from metal plate material. As depicted by Geresy, the standard design includes a bulbous hollow for receiving the ball on a vehicle for connection thereto. Further, the wall of the bulbous hollow continues in a lateral direction on the bottom side of the coupler to form a lateral marginal flange which extends beyond the bulbous hollow to form the perimeter of the trailer coupler when viewed from above.

As described above, the lateral marginal flange of the coupler extends beyond the walls of the bulbous hollow. With this design, the longitudinal edge of the lateral marginal flange becomes a first area of contact between a vehicle and the coupler. Thus, the projecting flange, although necessary for structural integrity, can cause extensive damage to vehicles when backing up to a trailer coupler for connecting a trailer to that particular vehicle.

For example, when a vehicle is being backed up to a trailer, the operator of the vehicle cannot see the trailer coupler which is obscured by the vehicle. Thus, unless the operator always has an additional person giving direction, the operator must guess the distance to backup. This many times leads to contact between the trailer coupler lateral marginal flange and the back of the vehicle. This contact causes damage to paint on the vehicle, bumper and/or license plate on many occasions.

This problem is further complicated by the operator having to guess the appropriate height of the coupler prior to backing under the trailer. The proper height can vary with the grade on which the vehicle and trailer are positioned. Thus, improper height can lead to contact between the lateral marginal flange and readily damaged portions of the vehicle, such as the trunk lid or even plastic lighting covers.

Although some trailer hitch guards have been developed, none have been developed to date to protect against metal-to-metal contact between the lateral marginal flange of the coupler and the vehicle when blindly backing underneath the trailer coupler for connection with the vehicle. For example, Young et al. (U.S. Pat. No. 4,509,770) disclose a decorative cover for the end of a draw bar which cannot be utilized to address the above-identified problem. Young et al. (U.S. Pat. No. 4,852,902) also disclose a towing hitch cover which protects the draw bar when the draw bar is not in place. Again, this design does not address the problems associated with contact between the coupler of the trailer, but rather the vehicle portion of the hitch assembly. Finally, Beckerer, Jr. (U.S. Pat. No. 4,955,968) discloses a protective cover for a trailer hitch which fits over the ball of the trailer. The cover is designed to protect operators from injury when they hit their leg on the ball on the vehicle when a trailer is not attached thereto. The design could not be utilized to protect against damage associated with the marginal lateral flange of the coupler contacting the vehicle when being attached thereto.

Accordingly, the need exists for a trailer coupler guard which protects against damage from metal-to-metal contact or metal-to-vehicle contact when a vehicle is blindly backed up to a trailer for connection thereto. The guard should provide a cushion for contact between the lateral marginal flange of the trailer and the vehicle, yet not interfere with, or contact the vehicle when the trailer is connected to the ball of the hitch for transport. Further, the guard should be easily installed by the consumer or trailer owner and inexpensive.

The present invention addresses these needs, as well as other problems associated with contact and subsequent damage due to contact between the lateral marginal flange of a trailer coupler and a vehicle. The present invention also offers further advantages over the prior art and solves problems associated therewith.

SUMMARY OF THE INVENTION

The present invention is a guard for a trailer coupler which prevents or reduces damage due to contact between the trailer coupler and vehicle when the vehicle is being connected to a trailer via the coupler. The guard is designed to be used in conjunction with couplers, the design of which has become standardized. The standardized design of a trailer coupler includes a bulbous hollow having a side wall which angles from a generally vertical direction to a horizontal direction to form a lateral marginal flange extending beyond the perimeter of the vertical wall of the bulbous hollow. The lateral marginal flange is the portion of the coupler which is first to contact a vehicle when backed under the coupler.

The guard of the present invention is specifically designed to fit over the lateral marginal flange to provide a cushion between the vehicle and the flange and thus, prevent damage to the vehicle when the vehicle bumps the trailer protected with the guard.

As previously stated, the lateral marginal flange defines a portion of the perimeter of the trailer coupler. The guard of the present invention includes a generally U-shaped member having a base and a first leg and a second leg extending from the base in a lateral plane. The first and the second leg extend from a closed end of the U-shaped member toward an open end of the U-shaped member.

The U-shaped member further includes a first longitudinal surface which defines the inside perimeter of the U-shaped member. The first longitudinal surface extends contiguously from the end of the first leg proximate the open end of the U-shaped member to the base at the closed end of the U-shaped member, then to the end of the second leg proximate the open end of the U-shaped member. The first longitudinal surface has a channel formed therein extending from the end of the first leg proximate the open end of the U-shaped member to the end of the second leg proximate the open end of the U-shaped member. In use, the guard is placed over the coupler with the lateral marginal flange received within the channel.

In a preferred embodiment, the first and the second leg angle toward each other as they extend laterally away from the closed end of the U-shaped member so that the legs releasably secure the U-shaped member when placed over the lateral marginal flange. Thus, in use, the ends of the legs are spread apart so that the lateral marginal flange is readily received within the channel. When the legs are released, the legs attempt to return to their preformed angled position, but instead contact the lateral marginal flange with a gripping friction fit.

The U-shaped member includes generally parallel U-shaped lateral surfaces. The surfaces define a height of the longitudinal surface. The height is chosen so that the U-shaped member does not contact a hitch or vehicle when the trailer is connected thereto.

The U-shaped member also includes a second longitudinal surface defining a contiguous outside perimeter of the U-shaped member. The second longitudinal surface preferably includes radiused edges connecting the second longitudinal surface to the generally parallel lateral surfaces.

The guard of the present invention can be adhesively secured to the coupler with the lateral marginal flange received within the channel. Alternatively, the guard can be placed over the coupler prior to backing the vehicle under the coupler. Upon backing the vehicle under the coupler and coupling the trailer to the vehicle, the guard can be removed and temporarily stored elsewhere. The guard of the present invention is preferably manufactured by an injection molding process so that the desired U-shape is preformed. The guard is preferably manufactured from a polymeric material which is sufficiently pliable to provide the desired cushion between the vehicle and coupler. A preferred material includes polyurethane.

These and various other advantages and features of novelty which characterize the present invention are pointed out with particularity in the claims annexed hereto and forming a part hereof. However, for a better understanding of the invention, its advantages, and the object obtained by its use, reference should be made to the drawings which form a further part hereof, and to the accompanying descriptive matter in which there are illustrated and described preferred embodiments of the present invention.

BRIEF DESCRIPTION OF THE DRAWINGS

In the drawings, in which like reference numerals indicate corresponding parts or elements of preferred embodiments of the present invention throughout the several views.

DETAILED DESCRIPTION OF THE PREFERRED EMBODIMENTS

Detailed embodiments of the present invention are disclosed herein. However, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one of skill in the art to variously practice the invention.

Figure 1:
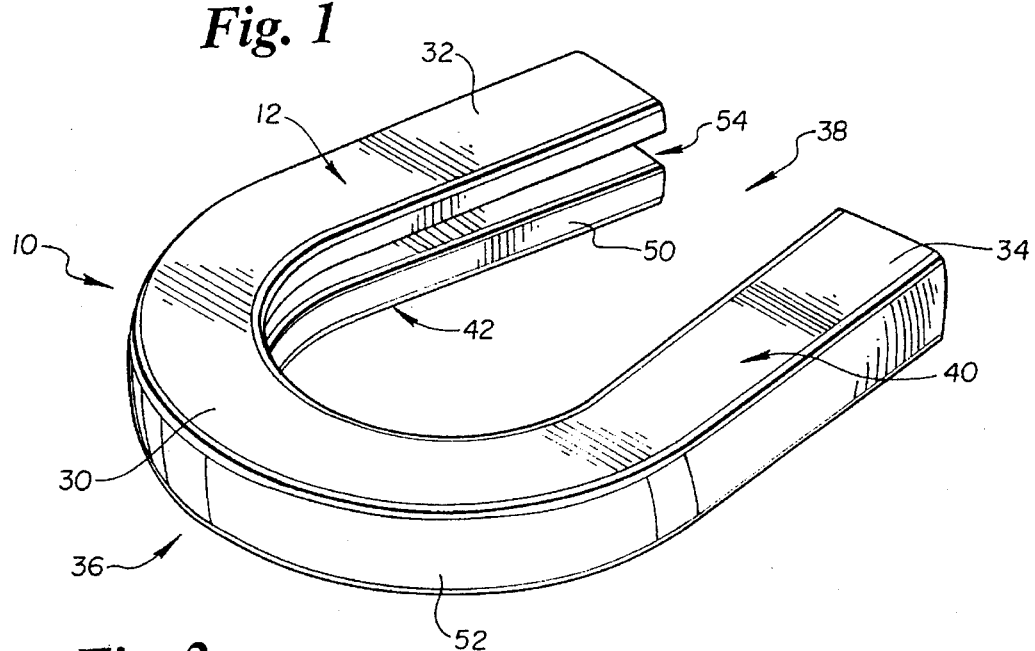
FIG. 1 is a perspective view of the guard of the present invention.
Figure 2:
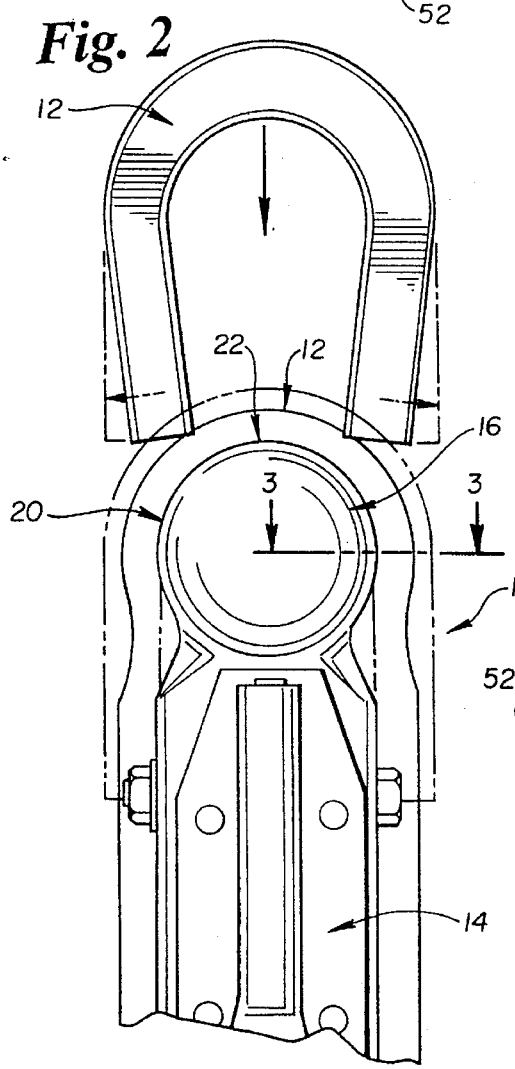
FIG. 2 is a top plane view of the guard of the present invention with phantom lines denoting flexing of the legs of the guard and the guard as placed on a coupler.

Now referring to FIG. 1, a perspective view of the guard 10 of the present invention is depicted. The guard comprises a generally U-shaped member 12 and is used in conjunction with a trailer hitch assembly. A standardized trailer hitch assembly first includes a ball on the vehicle. The trailer itself, as depicted in FIG. 2, includes a tongue 14 which terminates with a bulbous receptacle 16, which is received over the ball on the vehicle (not shown). The assembly proximate the bulbous hollow 16 is generally referred to as a trailer coupler 18.

As previously stated, the structural design of the trailer coupler 18 has become standardized. The vertical wall 20 of the bulbous hollow 16 continues downward and then turns in a lateral direction on the bottom side of the coupler 18 to form a lateral marginal flange 22. The lateral marginal flange 22 extends beyond the bulbous hollow 16 and forms the perimeter of the trailer coupler 18 when viewed from above as depicted in FIG. 2. The primary feature of the trailer coupler 18 design, which is of importance to the present invention, is the design of the lateral marginal flange 22 which extends outward in the forward direction beyond any other structural element of the coupler 18, and thus, is the point of contact between a vehicle and the coupler assembly when the vehicle backs too far under the coupler 18.

The generally U-shaped member 12 depicted in FIGS. 1 and 2 has a base portion 30, a first leg 32, and a second leg 34 extending from the base 30. The legs 32, 34 extend in a lateral plane from a closed end 36 of the U-shaped member 12 toward an open end 38 of the U-shaped member 12.

The U-shaped member 12, or alternatively, the U-shaped member could be referred to as a horseshoe-shaped member, further includes an upper lateral surface 40 and a lower lateral surface 42. The upper lateral surface 40 and lower lateral surface 42 are also generally U-shaped or horseshoe-shaped surfaces. In a preferred embodiment, the lateral surfaces 40, 42 lie in a horizontal plane generally parallel and spaced from one another. It is, however, recognized that the lateral surfaces 40, 42 could be angled or rounded and remain within the scope of the present invention. The lateral surfaces 40, 42 are preferably planar and lie within the horizontal plane to minimize the chance that either of the lateral surfaces 40, 42 would interfere with the movement of the coupler 16 when the trailer is connected to a vehicle.

The lateral surfaces 40, 42 define the height of the U-shaped member 12. Between the lateral surfaces 40, 42 lie a first longitudinal surface 50 and a second longitudinal surface 52. The first longitudinal surface 50 defines the inside perimeter of the U-shaped member 12 and extends contiguously from the end of the first leg 32 proximate the open end 38 of the U-shaped member 12, to the base 30 at the closed end 36 of the U-shaped member 12, then to the end of the second leg 34 proximate the open end 38 of the U-shaped member 12.

Figure 3:
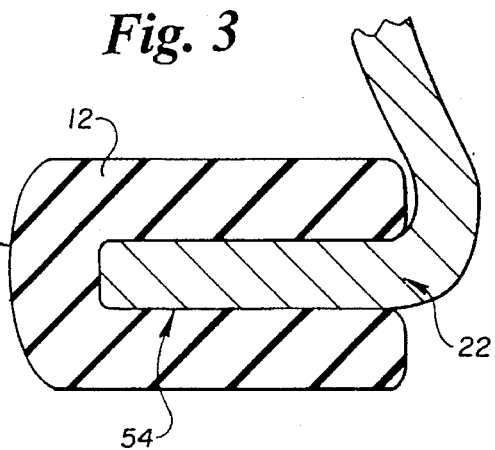
FIG. 3 is a partial sectional view taken along line 3—3 of FIG. 2.

The first longitudinal surface 50 further includes a channel 54 formed therein which extends from the end of the first leg 32 to the end of the second leg 34 proximate the open end of the U-shaped member 12. As best shown in FIG. 2 and FIG. 3, when the guard 10 is placed in contact with the coupler 18, the lateral marginal flange 22 is received within the channel 54.

Referring now to FIG. 3, the partial cross-sectional view along line 3—3 of FIG. 2 details the placement of the lateral marginal flange 22 within the channel 54 of the U-shaped member 12. Although FIG. 3 depicts the lateral marginal flange 22 contacting the walls of the channel 54 at all points on all sides, this is not necessary for the guard of the present invention to function. Gaps due to irregularities in the shape of the flange, which may vary from trailer to trailer, would not affect the performance of the guard 10. The channel 54 is designed with sufficient depth to allow some variation in the lateral marginal flange 22 dimensions.

The second longitudinal surface 52 defines a contiguous outside perimeter of the U-shaped member 12. The second longitudinal surface 52 also extends around the outside of the U-shaped member 12 from the end of the first leg 32 proximate the open end 38 of the U-shaped member 12, past the closed end 36 of the U-shaped member, and out to the end of the second leg 34 proximate the open end 38 of the U-shaped member 12. The second longitudinal surface 52 provides the surface for contact between the guard 10 and the vehicle being protected. Thus, the second longitudinal surface 52 is sufficiently pliable to allow flexing of the surface to minimize damage to the vehicle. The flexibility of this surface is a function of the material of construction and the thickness of the horseshoe-shaped member 12 extending between the second lateral surface 52 and the edge of the lateral marginal flange 22 when the guard is placed thereon. The material of construction and the thickness can be varied within the scope of the present invention.

In a preferred embodiment, the first leg 32 and second leg 34 angle toward each other as they extend away from the closed end 36 of the horseshoe-shaped member 12. The preformed angle assists in securing the guard to the lateral marginal flange 22. Thus, when the U-shaped member 12 is to be inserted over the lateral marginal flange 22, the first leg 32 and second leg 34 are flexed apart from one another so that the horseshoe-shaped member 12 is slidably received over the lateral marginal flange 22. When in place and released, the first leg 32 and second leg 34 are prestressed and attempt to return to their angled position. This provides a secure frictional fit which facilitates holding the U-shaped member 12 in place on the lateral marginal flange 22. Although not preferable, it is recognized that the legs could extend parallel to one another, and sufficient adhesive or other means could be utilized to secure the U-shaped member 12 to the lateral marginal flange 22.

In utilizing the guard of the present invention, it is recognized that the U-shaped member 12 can be placed in contact with the coupler 18 and held securely in place with an adhesive. Alternatively, the guard may be placed in position to protect the vehicle temporarily while the vehicle is connected to the trailer. Upon connection to the trailer, the U-shaped member could be removed and stored.

The guard of the present invention is preferably manufactured utilizing an injection molding process. A preferred material of construction is a polyurethane, preferably a thermoplastic polyurethane. Thus, in a preferred embodiment, the guard is manufactured at least in part from polyurethane. It is, however, recognized that other polymeric materials and methods of manufacture could be utilized to produce a preformed U-shaped guard and still be within the scope of the present invention. For example, the U-shaped member could be fabricated from standard plastic or rubber stock, and formed either by the manufacturer or customer. Alternatively, a form could be utilized to build layers onto, in a dip molding process, utilizing such materials as vinyl plastisol. The guard material could also be extruded in a profile shape and formed into the curved shape of the preferred embodiment. Thermoplastic elastomers and natural or synthetic rubber compounds could be utilized. The U-shaped member could also be free-poured into a casting utilizing a two-part polyurethane and an open mold. The selection of a high-pressure molding process in conjunction with a polyurethane is preferred based on the performance of the part and the cost of manufacture.

New characteristics and advantages of the invention covered by this document have been set forth in the foregoing description. It will be understood, however, that this disclosure is, in many respects, only illustrative. Changes may be made in details, particularly in matters of scope, size and arrangement of parts, without exceeding the scope of the invention. The scope of the invention is, of course, defined in the language in which the appended claims are expressed.

What is claimed is:

1. A guard for a trailer coupler having a lateral marginal flange defining a portion of the perimeter thereof, said guard comprising:

(a) a generally U-shaped member including a first and a second leg extending laterally from a closed end of said generally U-shaped member having a generally U-shaped upper lateral surface and a generally U-shaped lower lateral surface with a first longitudinal surface defining a contiguous inside perimeter of said U-shaped member therebetween, said first longitudinal surface having a channel formed therein extending the length of the inside perimeter of said U-shaped member and said first and said second leg angled toward each other as they extend away from said closed end, wherein in use said guard is placed in contact with said coupler with at least a portion of said lateral marginal flange received within said channel and said legs releasably secure said U-shaped member.

2. The guard of claim 1, wherein said U-shaped member is injection molded so that the shape of said U-shaped member is preformed.

3. The guard of claim 2, wherein said U-shaped member is injection molded from a polymeric material.

4. The guard of claim 3, wherein said polymeric material includes polyurethane.

5. A guard for a trailer coupler having a lateral marginal flange defining a portion of the perimeter thereof, said guard comprising:

(a) a generally U-shaped member having a generally U-shaped upper lateral surface and a generally U-shaped lower lateral surface with a first longitudinal surface defining a contiguous inside perimeter of said U-shaped member therebetween, wherein said generally U-shaped lateral surfaces are parallel and define a height of said longitudinal surface, said first longitudinal surface having a channel formed therein extending the length of the inside perimeter of said U-shaped member, wherein in use said guard is placed in contact with said coupler with at least a portion of said lateral marginal flange received within said channel with said height sufficiently small so that said U-shaped member does not contact either of said ball hitch and said vehicle when said trailer is connected to said ball hitch.

6. The guard of claim 5, wherein said U-shaped member includes a second longitudinal surface defining a contiguous outside perimeter of said U-shaped member, said second longitudinal surface having rounded edges connecting said second longitudinal surface to said generally parallel U-shaped lateral surfaces.

7. A guard for a trailer coupler having a lateral marginal flange defining a portion of the perimeter thereof, said guard comprising:

(a) a generally U-shaped member having a generally U-shaped upper lateral surface and a generally U-shaped lower lateral surface defining a base and a first leg and a second leg extending from said base in a lateral plane from a closed end of said U-shaped member toward an open end of said U-shaped member, said U-shaped member further including a first longitudinal surface defining the inside perimeter of said U-shaped member extending contiguously from the end of said first leg proximate the open end of said U-shaped member to the base at the closed end of said U-shaped member, then to the end of the second leg proximate the open end of said U-shaped member between said upper and lower lateral surfaces, said first longitudinal surface having a channel formed therein extending from the end of said first leg proximate the open end of said U-shaped member to the end of the second leg proximate the open end of said U-shaped member, wherein in use said guard is placed in contact with said coupler with at least a portion of said lateral marginal flange received within said channel.

8. The guard of claim 7, wherein said U-shaped member is injection molded so that said shape is preformed.

9. The guard of claim 8, wherein said U-shaped member is injection molded from a polymeric material.

10. The guard of claim 9, wherein said polymeric material includes polyurethane.

11. The guard of claim 9, wherein said first and said second leg angle toward each other as they extend away from said closed end of said U-shaped member so that said legs releasably secure said U-shaped member when placed over said lateral marginal flange.

12. The guard of claim 7, wherein said generally U-shaped lateral surfaces are parallel and define a height of said longitudinal surface, said height sufficiently small so that said U-shaped member does not contact either of a hitch and a vehicle when said trailer is connected to said hitch.

13. The guard of claim 12, wherein said U-shaped member includes a second longitudinal surface defining a contiguous outside perimeter of said U-shaped member, said second longitudinal surface having rounded edges connecting said second longitudinal surface to said generally parallel U-shaped lateral surfaces.

14. A method for protecting a vehicle having a ball hitch thereon from damage by contact with a lateral marginal flange of a trailer coupler on a trailer when connecting thereto, said method comprising the steps of:

(a) providing a generally U-shaped member having a generally U-shaped upper lateral surface and a generally U-shaped lower lateral surface with a first longitudinal surface substantially perpendicular to said upper and lower surfaces defining a contiguous inside perimeter of said U-shaped member therebetween, wherein said generally U-shaped lateral surfaces are parallel and define a height of said longitudinal surface, said first longitudinal surface having a channel formed therein extending the length of the inside perimeter of said U-shaped member; and, (b) placing said U-shaped member in contact with said coupler with at least a portion of said lateral marginal flange received within said channel, and wherein said height of said longitudinal surface is sufficiently small so that said U-shaped member does not contact either of said ball hitch and said vehicle when said trailer is connected to said ball hitch.

15. The method of claim 14, further comprising the step of adhesively securing said U-shaped member to said coupler with said lateral marginal flange received within said channel.

16. The method of claim 14, further comprising the steps of:

(a) backing said vehicle under said coupler so that said ball is aligned;

(b) coupling said trailer to said vehicle; and, (c) removing said U-shaped member.

* * * * *

UNITED STATES PATENT AND TRADEMARK OFFICE
CERTIFICATE OF CORRECTION

PATENT NO. : 5,575,494

DATED : November 19, 1996

INVENTOR(S) : DeVries

It is certified that error appears in the above-identified patent and that said Letters Patent is hereby corrected as shown below:

Col. 7, line 20, delete "9", and insert --7--.

Signed and Sealed this

Twenty-eighth Day of January, 1997

Attest:

BRUCE LEHMAN

Attesting Officer     Commissioner of Patents and Trademarks